(12) United States Patent
Chen et al.

(10) Patent No.: US 9,604,393 B2
(45) Date of Patent: Mar. 28, 2017

(54) WET PROCESS OF FABRICATING FIBER WALL PANELS

(75) Inventors: Jishuang Chen, Jiansu (CN); Zuodong Qin, Jiangsu (CN); Lin Zhang, Zhejiang (CN); Zhirong Tang, Zhejiang (CN); Miaofang Xu, Zhejiang (CN); Renni Zhou, Zhejiang (CN); Ying Zhou, Zhejiang (CN)

(73) Assignee: Nanjing University of Technology Dafeng Institute of Marine Industry, Dafeng (CN)

( * ) Notice: Subject to any disclaimer, the term of this patent is extended or adjusted under 35 U.S.C. 154(b) by 0 days.

(21) Appl. No.: 13/019,315

(22) Filed: Feb. 2, 2011

(65) Prior Publication Data

US 2012/0193828 A1    Aug. 2, 2012

(51) Int. Cl.
| | |
|---|---|
| *B29C 43/14* | (2006.01) |
| *D21F 13/00* | (2006.01) |
| *D21J 3/00* | (2006.01) |
| *B29C 43/20* | (2006.01) |
| *D21F 13/10* | (2006.01) |

(52) U.S. Cl.
CPC .............. *B29C 43/14* (2013.01); *B29C 43/20* (2013.01); *D21F 13/00* (2013.01); *D21J 3/00* (2013.01); *D21F 13/10* (2013.01)

(58) Field of Classification Search
USPC ........................................................ 162/226
See application file for complete search history.

(56) References Cited

U.S. PATENT DOCUMENTS

| | | | | |
|---|---|---|---|---|
| 1,756,722 | A * | 4/1930 | Arnold et al. .................. 162/28 |
| 2,872,337 | A * | 2/1959 | Heritage et al. .............. 428/499 |
| 4,038,131 | A * | 7/1977 | Baldwin et al. .............. 162/103 |
| 4,818,321 | A * | 4/1989 | Shimizu et al. .............. 156/254 |
| 5,539,028 | A * | 7/1996 | Bednar et al. .................. 524/47 |
| 5,582,682 | A * | 12/1996 | Ferretti ........................... 162/10 |
| 5,656,129 | A * | 8/1997 | Good et al. ..................... 162/13 |
| 6,444,315 | B1 * | 9/2002 | Barfurth et al. .............. 428/403 |
| 6,596,209 | B2 * | 7/2003 | Uhland et al. ............... 264/115 |
| 2006/0174798 | A1 * | 8/2006 | Churchill ......................... 106/2 |
| 2009/0255205 | A1 * | 10/2009 | Noble et al. .................... 52/630 |
| 2010/0078985 | A1 * | 4/2010 | Mahoney et al. ......... 297/446.1 |

FOREIGN PATENT DOCUMENTS

CN          101367227 A  *  2/2009

OTHER PUBLICATIONS

US 5,729,136, 03/1998, Maxwell (withdrawn)*
Barron, Teddi. From cow chips to cow barns. Inside Iowa State [online], May 19, 2000 [retrieved on Oct. 1, 2012]. Retrieved from the Internet <URL: http://archive.inside.iastate.edu/2000/0519/cowchips.html>.*
The DICT Development Group. "Fiberboard." in: Dict.org [online], [retrieved on Oct. 5, 2012]. Retrieved from the Internet, <URL: http://www.dict.org/bin/Dict>.*
Jones, Douglas W. The Prairie Paper Project [online], 1997 [retrieved on Oct. 28, 2014]. Retrieved from the Internet: <URL: http:homepage.cs.uiowa.edu/~jones/prairiepaper.html>.*

* cited by examiner

*Primary Examiner* — Benjamin Schiffman
(74) *Attorney, Agent, or Firm* — Bei & Ocean; George G. Wang

(57) ABSTRACT

This invention discloses a wet process of fabrication of fiber wall panel, which includes the following steps: 1) slurry making: mix nontimber type natural plant fiber slurry with grass family slurry according to 1:0~1.5 dry weight ratio, and add water to dilute this slurry; 2) slurry storage: pour the mixed slurry into slurry storage tank and add water for dilution; 3) suction straining and forming: pour slurry into mold cavity for cold pressing, dewatering, and forming, to yield wet blanks; 4) hot pressing, forming, and drying: move the Wet blanks to the hot pressing mold for hot pressing and remove moisture generated during hot pressing, to yield fiber wall panel. Fiber Wall panel made by this process features environment friendliness and high strength.

10 Claims, No Drawings

WET PROCESS OF FABRICATING FIBER WALL PANELS

FIELD OF THE INVENTION

This invention is within the material field and is related to a process of fabricating fiber wall panels for decoration. In particular, it is related to a wet process to mold and form the fire retardant fiber wall panel used for indoor decoration.

BACKGROUND OF THE INVENTION

Wall decoration material is an important part of the construction of buildings and an important area of development in new building materials. Construction is a pillar industry of national economy and also a fundamental work of construction modernization. At present, annual completed urban dwelling building area is about 335 million m$^2$, annual completed village and town dwelling building area is about 500 million m$^2$, and annual completed public buildings and production buildings in cities, towns, and villages is about 600 million m$^2$. Calculated at 2.5 times of total completed building area, the area of required wall decoration material is about 4.0 billion m$^2$. The huge market demand lays a good foundation for development of new wall decoration materials.

At present, there are many types of traditional indoor wall decoration materials. In domestic and overseas markets, these mainly include: gypsum board, aluminum plastic board, polyester fiber board, mineral wool board, new type fiber cement board used for external walls, environment friendly carpentry board, and plywood. However, not many of the products in the market fully meet the standard for environment friendly building materials. To a large extent, there is no decoration product made of regenerated material, hence being totally environment friendly. Plastic products are subject to hardening and embrittlement, and discoloring after being used for a long period of time. In addition, after being scrapped, degradation is a very difficult issue and may cause serious environment pollution. Although gypsum products are inexpensive and have a natural appearance, they are not elegant enough and subject to moisturing, falling, and discoloring (becoming yellow). Wood chip products are mostly used as inner lining of furniture decoration boards, and attached with decoration pattern veneer on the exterior. They are subject to problems of low firmness and can cause pollutions due to the adhesive used. The commonly used medium density fiberboard has good appearance and internal quality, but includes the adhesive that pollutes indoor environment and is expensive and requires more raw materials. This material is mainly used as a high grade decoration material.

Materials such as plywood and timber used for decoration and partition at present are basically inflammable materials. Although flame-resisting materials can be seen on the market, those materials are normally difficult to make and are very heavy. For example, the gypsum board has a high ignition point, and when burnt or subject to dry and hot weather, gypsum is prone to embrittlement, even bending, peeling, and cracking. In particular, in the situation of aggravated global greenhouse effect and the rise of air temperature year after year, as a flame-resisting material, gypsum cannot meet requirements on modern indoor decoration and improvement is urgently needed.

At present, most decoration boards in the market adopt a dry process, e.g. gypsum board, artificial decoration face board, polyester fiberboard, mineral wool board, plywood, etc. Most plant fiber wall panels adopt a dry process, i.e. mix crushed materials (corn stalk, straw, wheat stalk, bran coat, saw dust, etc.) with starch gum or thermo-plastic polymer, coupling agent, blowing agent, and lubricant etc. under normal temperature, and manually or mechanically feed the material to the mold, where pressing, squeezing, and forming is carried out. Steps of the dry process include crushing raw materials, adding additives and mixing them, loading, hot pressing, and forming, mold unloading, and obtaining the finished product. The disadvantages are: 1. A true environment friendly product capable of total degradation cannot be made. Most products in the market made by this process contain additions of some photolytic material or a small amount of starch not capable of degradation so as to be decomposed into fine powder. This is not a true degradation, and hence environmental pollution and its hazards remain. 2. Some products with starch added are subject to mold rotting in a wet environment and cannot last long. 3. They are very heavy, causing a relatively higher transport cost, and resulting in heavier wastes to be treated.

Among the technologies that have been disclosed at the present time, Chinese Patent CN1108988A discloses "A hardboard production process using dry and glue-free method", a method that subjects plant raw materials to fiber separation and drying, followed by forming and hot pressing without using synthetic resin, to yield a type of artificial board. Products made by this method have relatively low strength.

Chinese Patent CN1654180 discloses "An enclosed hot pressing process to make glue-free fiberboard", which provides a method to manufacture glue-free fiberboard of a low hot pressing pressure and relatively large range of product thickness and density. Due to the raw materials and specific process used, this type of fiberboard has an insufficient strength when the thickness is relatively small.

Chinese Patent CN1184161C discloses "A flame-resistant environment friendly decoration board and its method of manufacture", which provides a type of formaldehyde-free, flame-resistant, easy-to-make, low cost and environment friendly decoration board and its manufacture process. However, this dry process utilizes a conventional flame retardant and then sticky rice paste as adhesive for pressing and forming, so that the process is relatively complicated and is not a wet method.

Existing fiberboard products made by a wet forming process are mainly those having a thickness less than 5 mm, e.g. tableware. Such process basically adopts steam pressure type driving and pressing step, with a relatively low pressing pressure, so that a product exceeding certain thickness cannot be made and the surface precision is relatively low, let alone forming a convex-concave pattern. Up to now, there is no report that the paper pulp molding solid wet method of the paper making technology is used to manufacture flame-resisting fiber wall panels.

SUMMARY OF THE INVENTION

The technical difficulty to be solved by this invention is to provide a simple and low cost wet process to make fiber wall panels, which feature environment friendliness and high strength.

To this end, this invention provides a wet process that includes the steps as follows:

1) Slurry Making:

Mix a non-timber type natural plant fiber slurry ("fiber slurry" hereinafter) with a grass family plant slurry ("grass slurry" hereinafter) according to the dry weight proportion of 1.0~1.5, to prepare a raw material. Add water in this raw material for dilution. After mixing them even, a mixed slurry is obtained, which contains 3.0~5.0% of dry raw materials.

2) Slurry Storage:

Pour aforesaid mixed slurry into a slurry storage tank, and add water for dilution. After mixing even, a final slurry is obtained, containing 0.30.6% of dry raw weight, preferably 0.4%.

3) Suction Straining and Forming:

Transfer final slurry into mold cavity for cold pressing, dewatering, and forming, to obtain wet blanks. Wet blanks obtained are 1.01~0.0% of weight of slurry in mold cavity; 8.0% is preferred.

4) Hot Pressing, Forming, and Drying

Transfer aforesaid wet blanks into a hot pressing mold. Under the pressure of 0.5~5.0 kg/cm$^3$ and temperature of 98~280° C., hot press for 18~60 s; remove moisture generated during hot pressing to obtain fiber wall panels.

As an improvement of the wet process according to this invention, step 1) is to add a waterproofing agent and/or flame retardant and water in raw material. After mixing even, a mixed slurry is obtained. Waterproofing agent is 2.0%~15.0% of raw material's dry weight, and 2.5%~9.0% is preferred; flame retardant is 1.0%~45.0% of raw material's dry weight, and 18.0%~28.0% is preferred.

As another improvement of the wet process according to this invention, water is added in waterproofing agent and/or flame retardant for dilution. After full dissolution, a spraying liquid is obtained. Subject wet blanks obtained in step 3) to a first spraying of the spraying liquid, and then perform hot pressing, forming, and drying of step 4). During step 4), spray this spraying liquid again. Total amount of waterproofing agent used for spraying is 2.0%~15.0% of raw material's dry weight in mold cavity and 2.5%~9.0% is preferred; total amount of flame retardant used for spraying is 1.0%~45.0% of raw material's dry weight in mold cavity and 18.0%~28.0% is preferred.

As a further improvement to the wet process according to this invention, bamboo pulp, sugar cane, straw pulp, reed pulp, or waste paper pulp is used as the fiber slurry and the grass slurry is made from straw stalks or lawn grasses. The process to prepare the grass slurry is as follows: First remove any contaminated materials from the dried grass plant stalk or lawn grass. Then, break them up to lengths of 1~5 cm. Soak them in water for 60-72 h. Finally, prepare the grass slurry using a rubbing and grinding thread separator. The aforementioned straw stalk is rice stalk, corn stalk, wheat stalk, corn cob, sorghum stalk, or barley stalk; and the aforementioned lawn grass is tall fescue, ryegrass, or annual meadowgrass.

As a further improvement to the wet process according to this invention, the flame retardant is an organic silicon flame retardant (particularly, a water soluble organic silicon flame retardant), P-N system flame retardant, or inorganic flame retardant; and the waterproofing agent is an organic silicon series waterproofing agent or environment friendly waterproofing agent.

The organic silicon flame retardant can be selected from SFR10 of GE, polysiloxanes flame retardant, etc.

The P-N system flame retardant can be selected from FR2003 of Bo Ji Chemical Engineering Co. Ltd. or water soluble flame retardant FR-PN of Qingdao Haida Chemical Engineering Co. Ltd.

The inorganic flame retardant can be selected from aluminum hydroxide, magnesia hydroxide, zinc borate, borax, and ZR-BB02 of Hangzhou Yuanda Chemical Auxiliary Factory etc.

The organic silicon series waterproofing agent can be selected from DTS, methyl silicon oil containing hydrogen, and hydroxy silicon oil.

The environment friendly waterproofing agent can be selected from waterproofing agent FT-310A and T-556 of Hangzhou Yuanda Chemical Auxiliary Factory, waterproofing agent CH-2 waterproofing agent of Hangzhou Hanghua Harima Paper Making Chemical Co. Ltd., LZ19-06 type surface sizing agent of Pinghu Guantang Town Liangzuo Adhesive Manufacturing Plant, and HA-321 cation type neutral sizing agent made by Tianjin Synthetic Materials Industrial Research Institute etc.

As a further improvement to the wet process according to this invention, step 4) is performed under a pressure of 1.5~2.5 kg/cm$^2$ and temperature of 170~265° C. for 18~60 s.

As a further improvement to the wet process according to this invention, step 3) is performed under a pressure of 0.5~2.0 Kg/cm$^2$.

The process of this invention features the following advantages:

1. Since the fiber slurry such as sugar cane pulp, reed pulp, bamboo pulp, and straw pulp etc. is used as raw material, and the grass slurry made of a cereal plant stalk or lawn grass is used as auxiliary raw material, these raw materials are widely available and in extremely large stock, and are renewable resources. For example, in China, the annual output of crop stalk is as high as 620 million tons, and annual output of bagasse is about 40 million tons. Therefore, the process of this invention features easily obtained inexpensive raw materials. This invention avoids using timber pulps as raw material, thus contributing to protection of the ecological environment. The fiber wall panel of this invention satisfies the requirements on the medium density indoor decoration board as defined by international standard GB11718. In particular, the content of formaldehyde is zero. Therefore, this is a new type environment friendly product especially suitable for indoor decoration.

2. Since a suitable flame retardant and a waterproofing agent are added in raw material, and a special process is adopted, this ensures full absorption of the waterproofing agent and flame retardant, and makes the operation simple. The amount of waterproofing agent and flame retardant can be effectively controlled and operability is reliable. This not only achieves good waterproofing and flame retarding performance of the fiber wall panel, but also effectively avoids causing environmental pollutions during the production. At the same time, the production cost is kept low. The flame retardant and waterproofing agent are selected according to the principle that they are water soluble and not interfering with each other.

3. This invention takes full advantages of the strong bonding of the fiber slurry and good stiffness of the grass slurry made by a rubbing and grinding thread separator. While lowering the cost, the strength of the product is enhanced, thereby ensuring the fiber wall panel of certain thickness and strength.

4. Since this invention utilizes the special process, the disadvantage of a dry process which requires addition of adhesive is overcome, as well as the defect of an incapability to manufacture a solid product with certain thickness in the traditional wet process.

5. Using a special surface of the hot pressing mold, fine patterns with a solid convex-concave visual appearance can be achieved on the front side of the fiber wall panel, functioning not only to beautify environment, but also to absorb sound and isolate heat.

By the special process of this invention, the thickness of the fiber wall panel obtained can be within 1.2~10 mm, and the height of the solid convex-concave pattern on the front side of the fiber wall panel can reach 5~100 mm in depth. As a contrast, the convex-concave pattern of ordinary wall paper is below 0.5 mm.

Main performance indexes of the fiber wall panel manufactured by this invention are as follows: the content of formaldehyde is almost zero, reaching grade E0 (and no carcinogens such as radon, benzene, ammonia, and trichlorethylene are detected); compression strength is 200 Mpa; heat transfer coefficient is "≤0.020 W/m²·K; and dimensional stability under high temperature is ≤0.2%. All final testing data of the following preferred embodiments meet aforesaid performance indexes. Of the fiber wall panel containing the waterproofing agent and flame retardant, waterproofing properties meet testing standards GB-13341-2003 and GB/T1540-2002, and flame retarding effect meets China testing standards GB/T5464-1999 and GB/T 8627-1999.

Based on the above detailed description, the fiber wall panel manufactured by the process of this invention features light weight, sound absorption, and thermal insulation, making it a true environment friendly product. At the same time, the unique convex-concave design on the surface of the wall panel provides a beautiful and elegant design pattern, giving a good visual effect. These products can meet the demands of modern life.

DETAILED DESCRIPTION OF PARTICULAR EMBODIMENTS OF THE INVENTION

The following further describes this invention in combination with preferred embodiments, which however do not limit this invention.

Preferred Embodiment 1

A Wet Process of Manufacture of Fiber Wall Panels, Including the Following Steps 1. Slurry Making:

Pour the primitive color bamboo pulp of 90% dry weight obtained from the market into a beater and add water for dilution. Run the beater for 20 min. Degree of beating shall be 14~15SR. Then, transfer the resultant liquid into a compounding pool for 5 min of mixing, to obtain a mixed slurry. Dry weight of the primitive color bamboo pulp shall be 3% of the weight of mixed slurry.

2. Slurry Storage:

Place the mixed slurry in a slurry storage tank and add water for dilution. Use a 10~12 r/min mixer to stir to evenness, and obtain a final slurry. Dry weight of the primitive color bamboo pulp is 0.3% of the final slurry weight.

3. Suction Straining and Forming:

The final slurry prepared is sent via pipeline to the mold cavity of a fully automatic paper pulp molding forming machine manufactured by Hangzhou Asia-Europe Equipment Co. Ltd., which adopts a suction straining with vacuum pumping method. Water content which is 90% by weight of the slurry is removed in the mold cavity by means of pressing at 1.0 Kg/cm² and straining, so that wet blanks are obtained. In other words, the weight of wet blanks is 10% of slurry weight in the mold cavity.

4. Hot Pressing, Forming, and Drying

Transfer the wet blanks into the hot pressing mold of this forming machine. Under a closing force 1.5 kg/cm², the hot pressing upper mold and lower mold are closely mated together. The moisture in the wet blanks is vaporized and taken away by vacuum in the hot pressing lower mold. The temperature of the hot pressing upper mold is controlled at 18° C.±2° C. and temperature of the lower mold is controlled at 200° C. The total duration of hot pressing is 30 s. The product (fiber wall panel) is obtained at the end of this process.

5. Cutting of Edge and Inspection of Finished Product

After hot pressing and forming, compressed air is used to blow finished products onto the conveying belt, and then to edge trimming cutter to remove burrs. Finally, after passing quality inspection, the products are packed and moved into the warehouse. The mold size used by this preferred embodiment is 46×46 cm. The fiber wall panel thickness is 9 mm. Convex-concave depth is 5 mm. The solid convex-concave pattern can be changed by using a different mold. The designed pattern for this preferred embodiment is the "Chinese knot". Of course, patterns are not limited to this.

The compression strength of this fiber wall panel is ≥200 N. Its plane tensile strength is 0.78 Mpa. The density of the panel is 0.68 g/cm³.

Preferred Embodiment 2

A Wet Process of Manufacture of Fiber Wall Panels, in Which Step 1, i.e. Slurry Making, is Adjusted as Follows 1. Slurry Making:

Pour the primitive color bamboo pulp of 90% dry weight obtained from the market into a beater and add water for dilution. Run the beater for 20 min. The degree of beating shall be 14~15SR. Then, transfer the resultant liquid into a compounding pool for 5 min of mixing, and add the waterproofing agent of 5% dry weight of the primitive color bamboo pulp and the flame retardant of 20% dry weight of the raw material. After mixing in a 10 rpm mixer for 6 min, a mixed slurry is obtained. Dry weight of primitive color bamboo pulp shall be 3% of weight of mixed slurry.

The waterproof agent can be FT-556 waterproofing agent manufactured by Hangzhou Yuanda Chemical Auxiliary Factory. Flame retardant can be ZR-BB01 flame retardant manufactured by this factory.

Different upper molds and lower molds are selected. Other conditions are the same as those of preferred embodiment 1.

The thickness of the fiber wall panel obtained is 2.5 mm. Convex-concave depth is 5 mm.

The compression strength of this fiber wall panel is ≥200N. Its plane tensile strength is 0.71 Mpa and its panel density is 0.69 g/cm³.

Waterproofing properties meet testing standards GB13341-2003 and GB/T1540-2002, and flame retarding effect meets state testing standards GB/T5464-1999 and GB/T 8627-1999.

Preferred Embodiment 3

A Wet Process of Manufacture of Fiber Wall Panels, in which Step 1, i.e. Slurry Making, is Adjusted as Follows

1. Slurry Making:

Add the waterproofing agent and flame retardant in a predetermined proportion in a storage barrel. Add water and stir for dissolution. After mixing using the mixer for 6 min, add the primitive color bamboo pulp of 90% dry weight. Add water for dilution. Fully stir the liquid in the slurry storage pool. After 20 min, a mixed slurry is obtained. The waterproofing agent is 2.5% of the dry weight of the primitive color bamboo pulp, and the flame retardant is 18% of the dry weight of the primitive color bamboo pulp. The dry weight of the primitive color bamboo pulp in the mixed slurry is 3% by weight.

An upper mold and lower mold with a convex-concave pattern are used. All other conditions are the same as those of preferred embodiment 2.

The thickness of the fiber wall panel is 2.5 mm and the depth of the convex-concave is 5 mm.

Of the fiber wall panel formed, compression strength is $\geq 200N$, plane tensile strength is 0.73 Mpa, and panel density is 0.70 $g/cm^3$.

Both waterproofing effect and flame retarding effect meet Chinese state testing standard.

Preferred Embodiment 4

A Wet Process of Manufacture of Fiber Wall Panels, Including the Following Steps (in the Order as Presented)

1. Pretreatment

Remove any contaminated materials from the dried sorghum stalk and break them up to lengths of 1~5 cm. Soak the resultant matter in water for 60-72 h and then place it in the rubbing and grinding thread separator. High concentration mill will perform rubbing and grinding thread separation to obtain a mechanic pulp of certain concentration (i.e. sorghum stalk mechanic pulp).

In this pulp, the dry weight of the sorghum stalk is 10%.

2. Slurry Making

Mix the primitive color bamboo pulp of 60% dry weight with the sorghum stalk mechanic pulp of 10% dry weight (as a grass plant pulp) according to a dry weight ratio of 1:1, to yield the raw material. Place this raw material in a beater, and add water and run the beater for 25 min. The degree of beating is 14~15SR. Transfer this liquid to the compounding pool. Add the waterproofing agent of 9% dry weight of raw material and flame retardant of 25% dry weight of the raw material. Use a 10 rpm mixer to mix for 7 min to obtain a mixed slurry. The dry weight of the primitive color bamboo pulp+dry weight of the sorghum stalk mechanic pulp=raw material dry weight. The dry weight of the raw material in the mixed slurry is 5% by weight.

3. Slurry Storage:

Place the mixed slurry in the slurry storage tank, add water for dilution, and then use a 10~12 r/min mixer to mix it even, to obtain final slurry. Dry weight of the raw material in the slurry weight is 0.4%.

4. Suction Straining and Forming:

Slurry prepared is sent via pipeline to the mold cavity of the fully automatic paper pulp molding forming machine manufactured by Hangzhou Asia-Europe Equipment Co. Ltd., which adopts a suction straining using vacuum pumping method. Use a pressure of 1.0 $Kg/cm^2$ to press and remove moisture that is 99% of slurry weight in the mold cavity, to obtain wet blanks. In other words, the weight of wet blanks is 1% of the slurry weight in the mold cavity.

5. Hot Pressing, Forming, and Drying

Transfer the wet blanks to the hot pressing mold of this forming machine for forming and drying. Under the closing force of 1.5 $Kg/cm^2$, the hot pressing upper mold and lower mold are closely mated together. Moisture in wet blanks is vaporized and taken away by vacuum in the hot pressing lower mold. The temperature of the hot pressing upper mold is controlled at 180° C.±2° C. and temperature of the lower mold is controlled at 200° C. Total hot pressing duration is 18 s. Final products are obtained at the end of this process.

6. Cutting of Edge and Inspection of Finished Product

After the hot pressing and forming step, compressed air is used to blow the finished products onto a conveying belt, and then to an edge trimming cutter to remove the burrs. Finally, after passing quality inspection, the products are packed and moved into the warehouse.

The thickness of the fiber wall panel is 2.5 mm and the depth of convex-concave is 5 mm.

Of the fiber wall panel formed, the compression strength is $\geq 200N$, plane tensile strength is 0.67 Mpa, and the panel density is 0.64 $g/cm^3$.

Both waterproofing effect and flame retarding effect meet Chinese state testing standard.

Preferred Embodiment 5

A Wet Process of Manufacture of Fiber Wall Panels, Including the Following Steps (in the Order as Presented)

1. Pretreatment:

Same as preferred embodiment 4. In this sorghum stalk mechanic pulp, the dry weight of sorghum stalk is 40%.

2. Slurry Making:

Mix the primitive color bamboo pulp of 60% dry weight with the sorghum stalk mechanic pulp of 40% dry weight by dry weight proportion 3:2, to yield the raw material. Place this raw material in a beater and add water for dilution. Run the beater for 25 min. The degree of beating is 14~15SR. Then, transfer the resultant liquid into a compounding pool and add the waterproofing agent of 8% dry weight of the raw material, for 5 min of mixing (using the 10 rpm mixer), to obtain a mixed slurry. The dry weight of the primitive color bamboo pulp+dry weight of the sorghum stalk mechanic pulp=raw material dry weight. The dry weight of raw material in the mixed slurry is 5% by weight.

3. Slurry Storage:

Place the mixed slurry in the slurry storage tank, add water for dilution, and then use a 10·12 r/min mixer to mix it even, to obtain final slurry. Dry weight of the raw material is 0.3% of the slurry weight.

4. Suction Straining and Forming:

The slurry prepared above is sent via pipeline to the mold cavity of the fully automatic paper pulp molding forming machine manufactured by Hangzhou Asia-Europe Equipment Co. Ltd., which adopts a suction straining using vacuum pumping method. Use a pressure of 1.5 $Kg/cm^2$ to press and remove moisture that is 95% of slurry weight in the mold cavity, to obtain wet blanks. In other words, the weight of wet blanks is 5% of slurry weight in the mold cavity.

5. Hot Pressing, Forming, and Drying

Transfer the wet blanks to the hot pressing mold of the forming machine for forming and drying. Under a closing force of 1.5 Kg/cm², the hot pressing upper mold and lower mold are closely mated together. Moisture in wet blanks is vaporized and taken away by vacuum in the hot pressing lower mold. The temperature of the hot pressing upper mold is controlled at 180° C.+/−2° C. and temperature of the lower mold is controlled at 200° C. Total hot pressing duration is 20 s. Final products are obtained at the end of this process.

6. Cutting Edges and Inspection of Finished Products

After the hot pressing and forming step, compressed air is used to blow the finished products onto a conveying belt, and then to an edge trimming cutter to remove the burrs. Finally, after passing quality inspection, the products are packed and moved into the warehouse.

The thickness of the fiber wall panel is 2.5 mm and the depth of convex-concave is 5 mm.

Of the fiber wall panel formed, the compression strength is ≥200N, plane tensile strength is 0.69 Mpa, and panel density is 0.65 g/cm³.

The waterproofing effect meets Chinese state testing standard.

Preferred Embodiment 6

A Wet Process of Manufacture of Fiber Wall Panels, Including the Following Steps (in the Order as Presented)

1. Pretreatment:

Remove contaminated materials from the dried wheat stalk and break them up to lengths of 1~5 cm. Soak the resultant matter in water for 60 h and then place it in the rubbing and grinding thread separator. High concentration mill will perform rubbing and grinding thread separation to obtain a mechanic pulp of certain concentration (i.e. the wheat stalk mechanic pulp).

In this pulp, the dry weight of wheat stalk is 40%.

2. Slurry Making:

Mix the bamboo pulp of 60% dry weight with the wheat stalk mechanic pulp of 40% dry weight (as a grass plant pulp) according to dry weight proportion 1:1.5, to yield the raw material. Place this raw material in the beater and add water for dilution. Run the beater for 30 min. The degree of beating is 14~15SR. Then, transfer the resultant liquid into the compounding pool and using a 10 rpm mixer for 7 min of mixing, to obtain a mixed slurry. The dry weight of the raw material is 4% of weight of mixed slurry.

The dry weight of bamboo pulp+the dry weight of wheat stalk mechanic pulp=raw material dry weight.

3. Slurry Storage:

Place the mixed slurry in the slurry storage tank, add water for dilution, and then use a 10~12 r/min mixer to mix it even, to obtain the final slurry. The dry weight of the raw material is 0.5% of the slurry weight.

4. Suction Straining and Forming:

The slurry prepared is sent via pipeline to the mold cavity of the fully automatic paper pulp molding forming machine manufactured by Hangzhou Asia-Europe Equipment Co. Ltd., which adopts a suction straining using vacuum pumping method. Use the pressure of 1.0 Kg/cm² to press and remove moisture that is 99% of slurry weight in the mold cavity, to obtain wet blanks.

5. Prepare the Spraying Liquid:

Fully dissolve the waterproofing agent of 5% total dry weight of raw material and flame retardant of 18% total dry weight of raw material in water. For example, the concentration of waterproofing agent in the spraying liquid can be controlled at 10% by weight.

6. First Spraying:

Spray a half of the spraying liquid prepared above on all wet blanks. In other words, the amount of spraying liquid used on each wet blank equals the amount of the spraying liquid prepared in step 5 divided by 2 and then further divided by the number of the wet blanks.

7. Hot Pressing, Forming, and Drying

Transfer the wet blanks after first spraying to the hot pressing mold of this forming machine for forming and drying. Under a closing force of 1.5 Kg/cm², the hot pressing upper mold and lower mold are closely mated together. During hot pressing, the remaining half of the spraying liquid is evenly sprayed on all Wet blanks in the hot pressing mode. Moisture in wet blanks is vaporized and taken away by vacuum in the hot pressing lower mold. The temperature of the hot pressing upper mold is controlled at 180°±2° C. and temperature of the lower mold is controlled at 200° C. Total hot pressing duration is 25 s. Final products are made at the end of this process.

8. Cutting Edges and Inspection of Finished Products

After the hot pressing and forming step, compressed air is used to blow the finished products onto a conveying belt, and then to an edge trimming cutter to remove the burrs. Finally, after passing the quality inspection, the products are packed and moved into the warehouse.

The thickness of the fiber wall panel is 2.5 mm and the depth of convex-concave is 5 mm.

Of the fiber wall panel formed, the compression strength is ≥200N, plane tensile strength is 0.63 Mpa, and panel density is 0.62 g/cm³.

Both waterproofing effect and flame retarding effect meet Chinese state testing standard.

Preferred Embodiment 7

A Wet Process of Manufacture of Fiber Wall Panel

Mix the primitive color sugar cane pulp of 70% converted dry weight with a treated rice stalk mechanic pulp of 30% dry weight according to dry weight proportion of 2:1, to yield raw material. Dry weight of the primitive color sugar cane+dry weight of rice stalk mechanic pulp=dry weight of raw material. Place this raw material in the beater and add water for dilution. Run the beater for 30 min. Then, transfer this slurry into the compounding pool, and add the waterproofing agent and flame retardant for mixing of 10 min. The amount of the waterproofing agent is 9% of the raw material dry weight and the flame retardant is 25% of the raw material dry weight. This will yield a mixed slurry. Place this mixed slurry in the slurry storage tank and add water for dilution so that raw material dry weight is 0.35% of weight of mixed slurry. Control the hot pressing upper mold temperature at 240° C. and the lower mold temperature at 260° C. Hot pressing duration shall be 20 s. All other details are the same as preferred embodiment 4.

The thickness of the fiber wall panel is 2.5 mm and the depth of convex-concave pattern is 5 mm.

Of the fiber wall panel formed, compression strength is ≥200N, plane tensile strength is 0.66 Mpa, and panel density is 0.61 g/cm³.

Both the waterproofing effect and flame retarding effect meet Chinese state testing standard.

Preferred Embodiment 8

A Wet Process of Manufacture of Fiber Wall Panels

Change the primitive color bamboo pulp of 60% dry weight in preferred embodiment 4 to a white sugar cane pulp of 77% dry weight. Change the sorghum stalk mechanic pulp of 10% dry weight to a wheat stalk mechanic pulp of 23% dry weight. Mix them by dry weight proportion 1:1. Do not add the waterproofing agent or flame retardant. For hot pressing, control the upper mold temperature at 110° C. and the lower mold temperature at about 120° C. Total hot pressing duration is 60 s. Other details are the same as preferred embodiment 4.

The thickness of the fiber wall panel is 2.5 mm and the depth of the convex-concave pattern is 5 mm.

Of the fiber wall panel formed, the compression strength is ≥200N, plane tensile strength is 0.63 Mpa, and panel density is 0.60 g/cm³.

Preferred Embodiment 9

A Wet Process of Manufacture of Fiber Wall Panels

Change the primitive color bamboo pulp of 60% dry weight in preferred embodiment 4 to a white reed pulp of 90% dry weight. Change the sorghum stalk mechanic pulp of 10% dry weight to a corn stalk mechanic pulp of 10% dry weight. Mix these according to the dry weight proportion of 1:1. Add the waterproofing agent in the amount of 10% of the dry weight of the raw material and flame retardant in the amount of 30% of the dry weight of the raw material. Other details are the same as those of preferred embodiment 4.

The thickness of the fiber wall panel is 2.5 mm and the depth of the convex-concave pattern is 5 mm.

Of the fiber wall panel formed, compression strength is ≥200N, plane tensile strength is 0.64 Mpa, and panel density is 0.63 g/cm³.

Both waterproofing effect and flame retarding effect meet the Chinese state testing standard.

Finally, it is understood that the above described is only a number of particular preferred embodiments of this invention. Of course, this invention is not limited to these preferred embodiments and may have many variations, which can be made by people with ordinary skill in the art and shall be deemed within the protection scope of this invention.

What is claimed is:

1. A wet process of fabricating fiber wall panels with a decorative convex-concave pattern surface, comprising the steps of:
   1) providing a grass slurry, being made by a process comprising steps of (a) breaking dried grass plant stalk or lawn grass to lengths of 1-5 cm, (b) soaking the grass plant stalk or lawn grass from step (a) for 30-72 hours, and (c) rubbing and grinding the plant stalk or lawn grass from step (b) into the grass slurry using a rubbing and grinding thread separator;
   2) providing a fiber slurry separate from the grass slurry;
   3) making a mixed slurry, comprising mixing the fiber slurry and the grass slurry, at a weight ratio of the dry ingredients of the fiber slurry to the dry ingredients of the grass slurry of 1.0~1.5 to yield a raw material and adding water to the raw material for dilution to yield the mixed slurry in which the dry weight of the raw material accounts for 3.0-5.0% by weight;
   4) storing the mixed slurry, comprising pouring the mixed slurry into a slurry storage tank, and adding water for dilution to yield a final slurry in which dry weight of the raw material accounts for 0.3-0.6% by weight;
   5) forming a wet blank, comprising transferring the final slurry into a mold for cold pressing, dewatering, and forming, to form the wet blank the weight of which is 1.0-10.0% of the weight of the final slurry added in the mold; and
   6) forming a fiber wall panel, comprising transferring the wet blank into a hot pressing mold to perform hot pressing for 18-60 seconds at a pressure of 0.5-5.0 Kg/cm² and a temperature of 98-280° C. for obtaining the fiber wall panel.

2. The wet process of claim 1, wherein step 1) further comprises adding a waterproofing agent and/or flame retardant, the waterproofing agent being 2.0-15.0% of dry weight of the raw material, and the flame retardant being 1.0-45.0% of dry weight of the raw material.

3. The wet process of claim 1, further comprising a step of making a spraying liquid containing a waterproofing agent and flame retardant in a water solution; and a step of spraying the wet blank formed in step 5) for a first time with the spraying liquid and then during step 4) for a second time with the spraying liquid, in which the amount of the waterproofing agent is 2.0-15.0% of the dry weight of the raw material added in the mold when two spraying operations are combined, and the amount of flame retardant is 1.0-45.0% of the dry weight of the raw material added in the mold when two spraying operations are combined.

4. The wet process of claim 1, wherein the fiber slurry is bamboo pulp, sugar cane, straw pulp, reed pulp, or waste paper pulp; and the grass slurry is made from grass family straw stalk or grass family lawn grass.

5. The wet process of claim 4, wherein the grass slurry is prepared by first removing contaminated matters from a dried grass plant stalk or lawn grass, breaking up the grass plant stalk or lawn grass to lengths of 1-5 cm, soaking the grass plant stalk or lawn grass in water for 60-72 hours, and finally rubbing and grinding to a state of a slurry.

6. The wet process of claim 5, wherein the cereal plant stalk is rice stalk, corn stalk, wheat stalk, corn cob, sorghum stalk, or barley stalk; and the lawn grass is tall fescue, ryegrass, or annual meadowgrass.

7. The wet process of claim 2, wherein said flame retardant is organic silicon flame retardant, P-N system flame retardant, or inorganic flame retardant; and said waterproofing agent is organic silicon series waterproofing agent or environment friendly waterproofing agent.

8. The wet process of claim 2, wherein the flame retardant is water-soluble organic silicon flame retardant.

9. The wet process of claim 8, wherein in step 6) hot pressing is performed at a pressure of 1.5-2.5 Kg/cm² and a temperature of 170-265° C. for 18-60 seconds.

10. The wet process of claim 9, wherein in step 5) cold pressing is performed at a pressure of 0.5-2.0 Kg/cm².

* * * * *